(12) United States Patent
Zhamu et al.

(10) Patent No.: US 8,747,623 B2
(45) Date of Patent: Jun. 10, 2014

(54) ONE-STEP PRODUCTION OF GRAPHENE MATERIALS

(75) Inventors: Aruna Zhamu, Centerville, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 196 days.

(21) Appl. No.: 13/317,100

(22) Filed: Oct. 11, 2011

(65) Prior Publication Data

US 2013/0087446 A1     Apr. 11, 2013

(51) Int. Cl.
*C01B 31/02* (2006.01)
*B01J 19/12* (2006.01)

(52) U.S. Cl.
USPC ................. 204/157.47; 204/157.43

(58) Field of Classification Search
USPC .......... 204/157.43, 157.47; 977/734
See application file for complete search history.

(56) References Cited

U.S. PATENT DOCUMENTS

| | | | | |
|---|---|---|---|---|
| 3,404,061 A * | 10/1968 | Bochman et al. | ........... | 423/460 |
| 3,475,244 A * | 10/1969 | Sanders, Jr. | ........... | 423/448 |
| 6,306,264 B1 * | 10/2001 | Kwon et al. | ........... | 204/157.43 |
| 6,872,330 B2 | 3/2005 | Mack et al. | | |
| 7,071,258 B1 | 7/2006 | Jang et al. | | |
| 7,550,529 B2 * | 6/2009 | Drzal et al. | ........... | 524/495 |
| 7,754,184 B2 * | 7/2010 | Mercuri | ........... | 977/775 |
| 7,892,514 B2 * | 2/2011 | Jang et al. | ........... | 423/448 |
| 8,075,794 B2 * | 12/2011 | Ganguli et al. | ........... | 524/495 |
| 2004/0127621 A1 | 7/2004 | Drzal et al. | | |
| 2006/0148965 A1 | 7/2006 | Drzal et al. | | |
| 2010/0074835 A1 * | 3/2010 | Mercuri | ........... | 423/448 |
| 2013/0102084 A1 * | 4/2013 | Loh et al. | ........... | 204/157.42 |

OTHER PUBLICATIONS

Sridhar et al, Carbon (2010), "Synthesis of graphene nano-sheets using eco-friendly chemicals and microwave radiation," vol. 48, pp. 2953-2957.*
Janowska et al, "Microwave Synthesis of Large Few-Layer Graphene Sheets in Aqueous Solution of Ammonia," Nano. Res. (2010) 3: 126-137.*
Wei et al, "A rapid and efficient method to prepare exfoliated graphite by microwave irradiation," Carbon vol. 47 (2008), pp. 337-339.*
Yan et al, "Preparation of exfoliated graphite containing manganese oxides with high electrochemical capacitance by microwave irradiation," Carbon vol. 47 (2009), pp. 3371-3374.*
Bor Z. Jang and A Zhamu, "Processing of Nano Graphene Platelets (NGPs) and NGP Nanocomposites: A Review," J. Materials Sci. 43 (2008) 5092-5101.
Yang, et al. "Tow-dimensional Graphene Nano-ribbons," J. Am. Chem. Soc. 130 (2008) 4216-17.

* cited by examiner

*Primary Examiner* — Keith Hendricks
*Assistant Examiner* — Colleen M Raphael

(57) ABSTRACT

A method of producing exfoliated graphite or graphene from a graphitic or carbonaceous material. The method includes: (a) dispersing a graphitic material in a liquid intercalating agent to form a suspension; and (b) subjecting the suspension to microwave or radio frequency irradiation for a length of time sufficient for producing the exfoliated graphite or graphene. In one preferred embodiment, the intercalating agent is an acid or an oxidizer, or a combination of both. The method enables production of more electrically conducting graphene sheets directly from a graphitic material without going through the chemical intercalation or oxidation procedure. The process is fast (minutes as opposed to hours or days of conventional processes), environmentally benign, and highly scalable.

29 Claims, 4 Drawing Sheets

500 nm

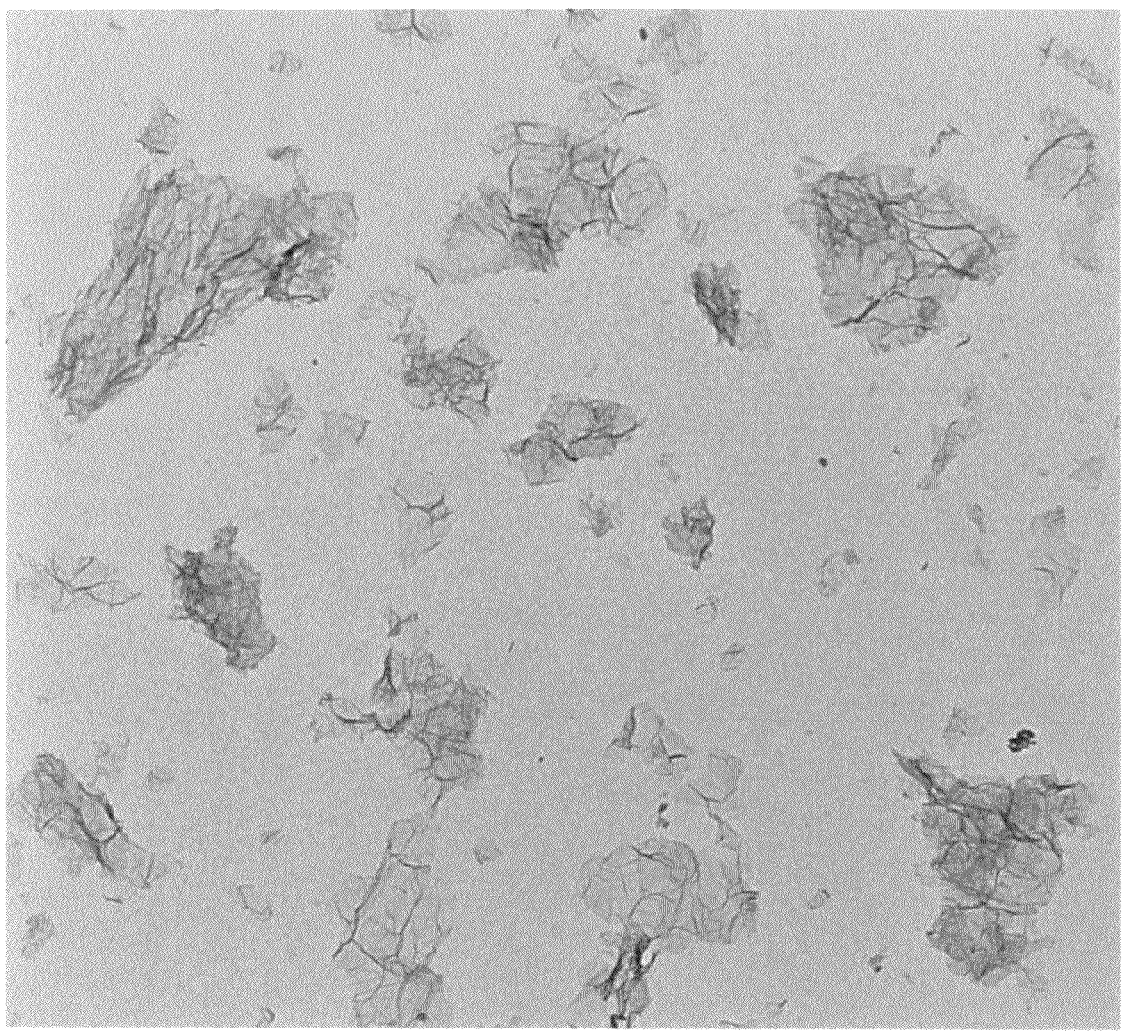
FIG. 3(B)  500 nm

ONE-STEP PRODUCTION OF GRAPHENE MATERIALS

GOVERNMENT GRANT INFORMATION

This invention is based on the research result of a US National Science Foundation (NSF) Small Business Technology Transfer (SBIR-STTR) project.

FIELD OF THE INVENTION

The present invention relates to a method of producing graphene materials, including pristine graphene, graphene oxide, graphene fluoride, and functionalized graphene. The method combines inter-graphene expansion, intercalation, exfoliation, and separation of graphene sheets in one step, dramatically shortening the time to produce graphene and significantly reducing the amount of chemicals used. The method also enables the use of more environmentally benign chemicals.

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, hydrogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this chemical production process:

(1) The process requires the use of large quantities of several undesirable chemicals, such as sulfuric acid, nitric acid, and potassium permanganate or and sodium chlorate.
(2) The chemical treatment process requires a long intercalation and oxidation times, typically 5 hours to five days.
(3) Strong acids consume a significant amount of graphite during this long intercalation/oxidation process by "eating their way into the graphite" (converting graphite into carbon dioxide, which is lost in the process). It is not unusual to lose 20-50% by weight of the graphite material immersed in strong acids and oxidizers.
(4) The thermal exfoliation requires a high temperature (typically 800-1,050° C.) and, hence, is a highly energy-intensive process.
(5) Both heat- and solution-induced exfoliation approaches require a very tedious washing and purification step. For instance, typically 2.5 kg of water is used to wash and recover 1 gram of GIC, producing huge quantities of waste water that need to be properly treated.
(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to address these issues.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [[B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Tow-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Hence, an urgent need exists to have a graphene production process that requires a reduced amount of undesirable chemical, shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets.

SUMMARY OF THE INVENTION

The present invention provides a strikingly simple, fast, scalable, environmentally benign, and cost-effective process that meets the aforementioned needs. This method of producing exfoliated graphite or graphene from a graphitic or carbonaceous material comprises subjecting a suspension (containing a graphitic or carbonaceous material dispersed in a liquid intercalating agent) to microwaves for a length of time sufficient for producing the exfoliated graphite or graphene. The starting material (graphitic or carbonaceous material) has never been previously intercalated or chemically oxidized. This starting material is not a graphite intercalation compound (GIC) or graphite oxide (GO). This is essentially a single-step process. After graphite powder is dispersed in an intercalating agent (it takes less than 1 minute to disperse), the resulting suspension is immediately exposed to microwaves. In less than another 5 minutes, graphite is fully exfoliated. This process is stunningly short and simple.

It may be noted that L. Drzal, et al ["Expanded Graphite and Products Produced Therefrom," US Pub. No. 20040127621 (Jul. 1, 2004) and US 20060148965 (Jul. 6, 2006)] use microwave to produce exfoliated graphite nano-platelets. In this prior art process, microwave was used after natural graphite had been fully intercalated and oxidized with the conventional strong acid treatments, and after the intercalated powder had been repeatedly rinsed, dried, and recovered from the liquid. This dried powder is GIC or GO, which has been heavily oxidized with their structure chemically altered and damaged. Microwave heating was used to simply replace furnace heating for more energy-efficiently heating the GIC to decompose the interstitial sulfuric acid or nitric acid species residing inside graphite. The thermally induced decomposition products are volatile gases (such as $NO_x$ and $SO_x$) that exert high internal gas pressure to push apart neighboring graphene sheets, a process commonly referred to as exfoliation. The sequence of this prior art approach is clearly explained in various places in Drzal's patent applications, including the Abstract and all the examples presented. This approach still suffers from the aforementioned seven (7) major problems, except for the notion that microwave might be more energy efficient as compared to tube furnace heating for the purpose of exfoliating already pre-intercalated graphite. This energy efficiency appears to be the main incentive for Drzal et al to use microwave energy, instead of furnace heating, to thermally exfoliate their GIC/GO. In contrast, in the presently invented process, microwave energy is switched on as soon as graphite is poured into and uniformly dispersed in a liquid intercalating agent; no pre-intercalation or pre-oxidation is involved. Hence, no subsequent high temperature exposure for exfoliation is required and no undesirable gas emission occurs.

A preferred embodiment of the present invention is a method of directly submitting a suspension (containing graphite powder dispersed in a liquid intercalating agent) to a microwave treatment, wherein the liquid intercalating agent has a single component only (e.g. sulfuric acid or nitric acid only, but not both) and is not a mixture of an acid and an oxidizing agent. This is quite surprising, considering the notion that all of the chemical methods of producing graphene involve the utilization of a mixture of an acid (e.g. sulfuric acid) and an oxidizer (e.g. nitric acid or a combination of nitric acid and potassium permanganate). It has been commonly believed that a combination of an intercalant and an oxidizer is required to obtain a proper graphite intercalation compound (GIC) or graphite oxide (GO). In other words, it has been believed that sulfuric acid and the oxidizer work in a concerted manner to enable the intercalation and oxidation of the bulk of graphite; both the intercalant and the oxidizer being indispensible. The present invention defies this expectation in many ways:

(1) The liquid intercalating agent can contain just one component (an acid alone or an oxidizer alone) or multiple components (2 or more).
(2) Smaller amounts or less concentrated acids can work equally well.
(3) Weaker acids (e.g. acetic acid) and weaker oxidizer ($H_2O_2$) also work very well.
(4) Environmentally benign acids, such as formic acid and carboxylic acid, are also effective.

The liquid intercalating agent can be an acid selected from sulfuric acid, sulfonic acid, formic acid, acetic acid, or nitric acid. There is no particular constraint on the type of acid that can be used. The liquid intercalating agent may be a mixture containing an acid and an oxidizing agent. The intercalating agent can be a carboxylic acid selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. The carboxylic acid may be selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anhydrides thereof, reactive carboxylic acid derivatives thereof, and combinations thereof. The intercalating agent can be a carboxylic acid admixed with hydrogen peroxide as an oxidizing agent. Preferably, carboxylic acid and hydrogen peroxide are mixed at a weight ratio of 100:1 to 100:50.

Quite significantly, the microwave exposure time can be less than 5 minutes, often less than 2 minutes, or even less than 1 minute. If deemed necessary, the microwave exposure step may be followed by a step of subjecting the exfoliated graphite to a mechanical shearing treatment to produce a graphene material with further reduced lateral dimensions and/or thickness (if containing multi-layer graphene platelets). The mechanical shearing treatment comprises using air milling, air jet milling, ball milling, rotating-blade mechanical shearing, ultrasonication, or a combination thereof. The exfoliated graphite or graphene may be compressed to form a flexible graphite product. The graphitic material may be selected from natural graphite, synthetic graphite, highly oriented pyrolytic graphite, meso-carbon micro-bead, graphite fiber, graphitic nano-fiber, graphite oxide, graphite fluoride, chemically modified graphite, exfoliated graphite, or a combination thereof.

The presently invented process is capable of producing single-layer graphene sheets. In many examples, the graphene material produced contains at least 80% single-layer graphene sheets. The graphene produced can contain pristine graphene, oxidized graphene with less than 5% oxygen content by weight, graphene fluoride with less than 5% fluorine by weight, graphene with a carbon content no less than 95% by weight, or functionalized graphene.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber.

One preferred specific embodiment of the present invention is a method of producing a nano graphene platelet (NGP) material that is essentially composed of a sheet of graphene plane or multiple sheets of graphene plane stacked and bonded together (typically, on an average, up to five sheets per multi-layer platelet). Each graphene plane, also referred to as a graphene sheet or basal plane, comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 200 nm and 20 µm, but could be longer or shorter.

Figure 2A:
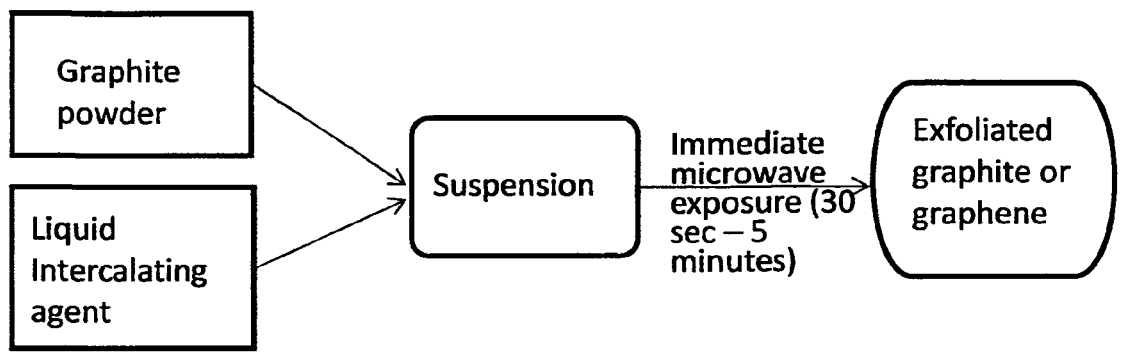
FIG. 2 Flowcharts for the comparison of (A) the presently invented one-step process and (B) the conventional, multi-step process of producing graphene materials.

The present invention provides a strikingly simple, fast, scalable, environmentally benign, and cost-effective process that avoids essentially all of the drawbacks associated with prior art processes. As schematically illustrated in FIG. 2(A), one preferred embodiment of this method entails subjecting a suspension (containing a graphitic material dispersed in a liquid intercalating agent) to microwave or radio frequency irradiation for a length of time sufficient for producing the exfoliated graphite or graphene. This is essentially a single-step process. After graphite powder is dispersed in an intercalating agent, the resulting suspension is immediately exposed to microwave irradiation. In less than another 5 minutes (typically less than 2 minutes, and often less than 1 minute), graphite is fully exfoliated, forming mostly single-layer graphene and, in some cases, some few-layer graphene (mostly no more than 5 layers). This process is stunningly short and simple.

Figure 1:
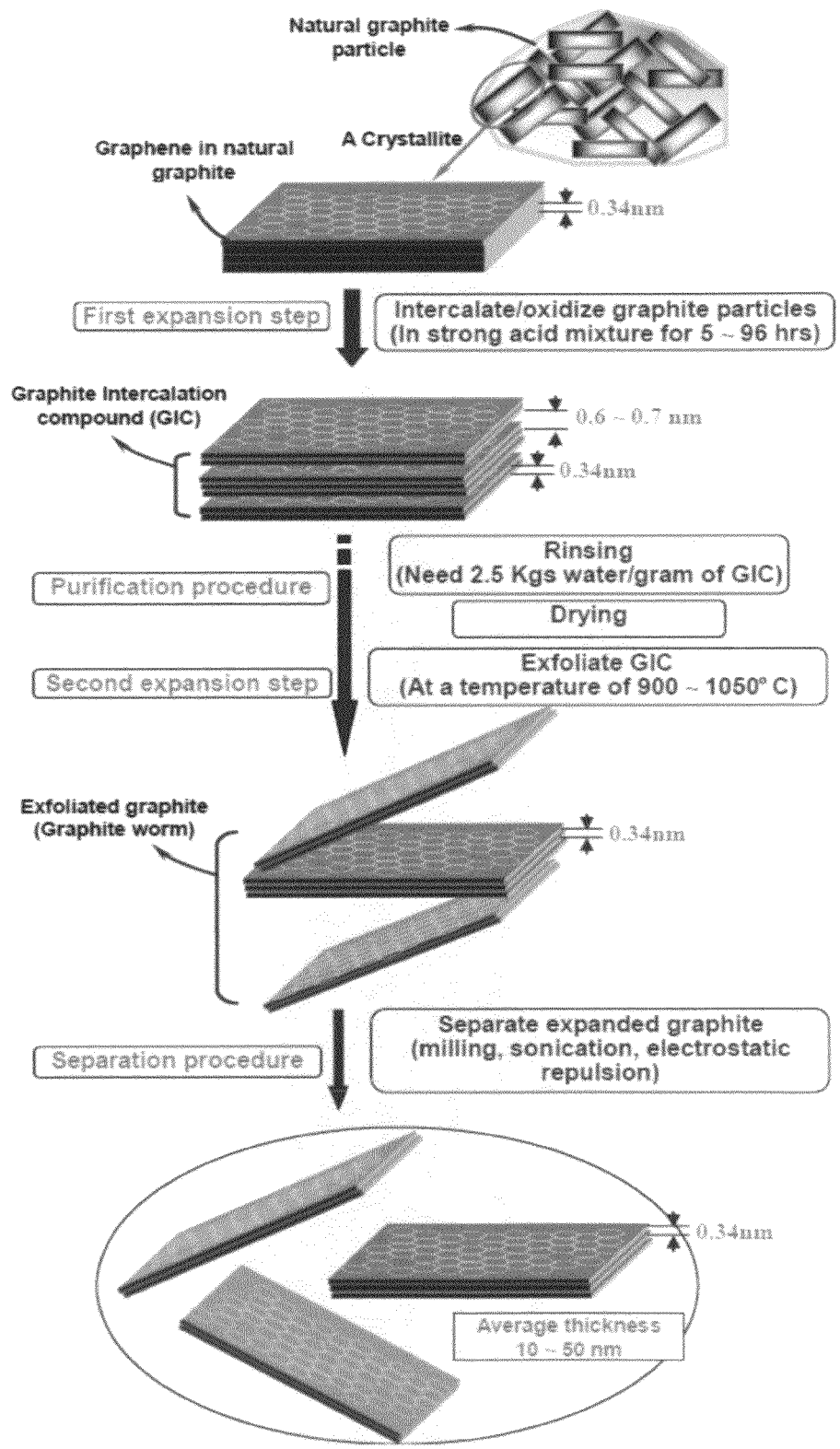
FIG. 1 A flow chart showing the most commonly used prior art process of producing highly oxidized NGPs that entails tedious chemical oxidation/intercalation, rinsing, and high-temperature exfoliation procedures.
Figure 2B:
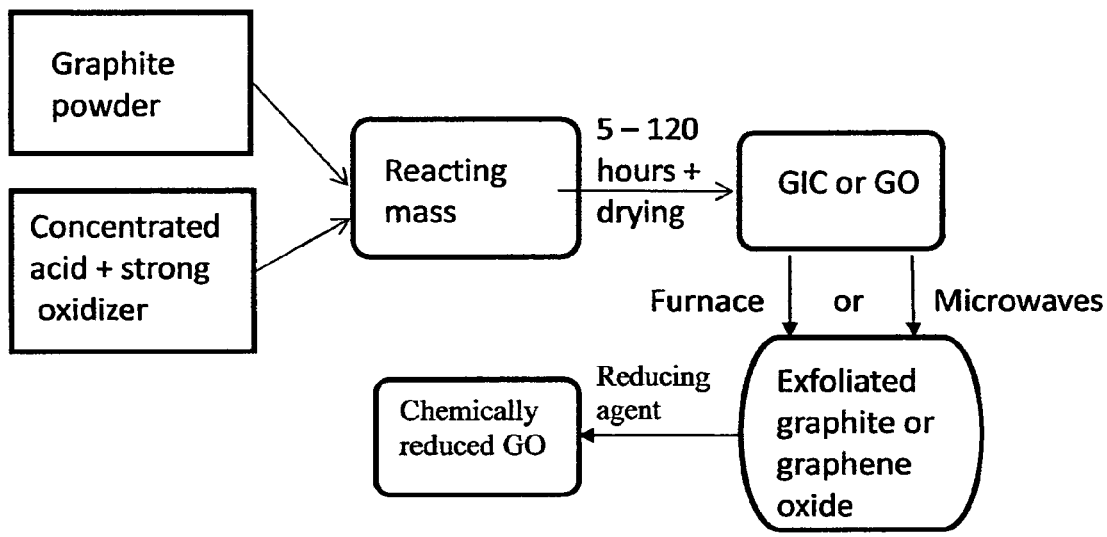

In contrast, as shown in FIG. 1 and FIG. 2(B), the prior art chemical processes typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished in two ways. One is to expose the GIC to a furnace pre-set at a temperature of typically 800-1100° C. (more typically 950-1050° C.). The other is to expose the GIC to microwave irradiation, as disclosed in the patent applications of L. Drzal, et al ["Expanded Graphite and Products Produced Therefrom," US Pub. No. 20040127621 (Jul. 1, 2004 and US 20060148965 (Jul. 6, 2006)].

It is again critically important to recognize that Drzal et al use microwave to produce exfoliated graphite nanoplatelets from GIC (not from the starting graphite, as in our invention) after natural graphite has been fully intercalated and oxidized with the conventional strong acid treatments, and after the intercalated powder had been dried and recovered from the liquid. This Drzal approach still suffers from the seven (7) major problems described in the Background section, despite the notion that microwave might be more energy efficient as compared to tube furnace heating for the purpose of exfoliating pre-intercalated graphite. In contrast, in the presently invented process, microwave energy is switched on as soon as graphite is poured into and uniformly dispersed in a liquid intercalating agent. Since no pre-intercalation or pre-oxidation is involved, we can save 5-120 hours of graphite intercalation/oxidation time.

It is also significant to understand that Drzal's GICs are identical to the GICs obtained by all prior art processes and necessarily contain sulfuric acid and nitric acid in the inter-graphene spaces and, hence, necessarily involve the decomposition of $H_2SO_4$ and $HNO_3$ to produce volatile gases (e.g. $NO_x$ and $SO_x$) during their subsequent microwave energy-assisted, thermal exfoliation process. The $NO_x$ and $SO_x$ are highly regulated species that can potentially pose some environmental issues. In contrast, our new process does not involve exposing GIC to a high temperature and, hence, does not generate any of these volatile species. Clearly, the presently invented process is not an obvious variant of the microwave energy-assisted thermal exfoliation of GIC. The GIC and exfoliated graphite have a long history (>50 years) and over such a long period of time, the prior art workers have always believed that thermal exfoliation of graphite must go through a tedious chemical intercalation/oxidation of graphite. The need to use combined strong acids and oxidizers to intercalate and oxidize graphite for an extended period of time to produce the so-called GIC or "expandable graphite" is now completely avoided.

Additionally, our new process does not require a mixture of concentrated sulfuric acid and fuming nitric acid and/or potassium permanganate. Dilute acids or weaker acids, such as acetic acid and formic acid, can be a very effective intercalating agent. Further, we can use just an acid alone or an oxidizer alone (but not both), although we can also use a combination. These are very surprising and have defied the expectations of those who work in exfoliated graphite or graphene industry. Furthermore, no subsequent high temperature exposure for exfoliation is required since exfoliated graphite or graphene is directly produced with a simple microwave irradiation of graphite in the presence of a liquid intercalating agent.

Although the mechanisms remain poorly understood, this revolutionary process of the present invention appears to essentially combine the required functions of graphene plane expansion, intercalant penetration, exfoliation, and separation of graphene sheets from one another into one single step. The whole process can take less than 2 minutes. This is absolutely stunning, a shocking surprise to even those top scientists and engineers or those of extraordinary ability in the art.

The frequency of microwave or radio frequency irradiation that can be used for practicing the instant invention does not have to be 2.45 GHz, which is used in a domestic microwave oven. Preferably, the frequency is between 1 and 20 GHz and more preferably between 2 and 10 GHz.

A preferred embodiment of the present invention is a method of directly submitting a graphite or carbon material suspension (containing graphite and/or carbon powder dispersed in a liquid intercalating agent) to a microwave treatment, wherein the liquid intercalating agent has a single component only (e.g. either sulfuric acid or nitric acid only, but not both) and is not a mixture of an acid and an oxidizing agent. This is quite surprising, considering the notion that all of the chemical methods of producing graphene involve the utilization of a mixture of an acid (e.g. sulfuric acid) and an oxidizer (e.g. a combination of nitric acid and potassium permanganate). This is further explained below:

It has been commonly believed that a combination of an intercalant and an oxidizer is required to obtain a proper graphite intercalation compound (GIC) or graphite oxide (GO). This belief has been based on the notion that sulfuric acid serves as an intercalant that penetrates into inter-graphene spaces and stays therein when the intercalation/oxidation procedure is completed and the powder is recovered by drying. In the meantime, the oxidizing agent serves to oxidize the edge and then the interior of graphene planes, effectively increasing the inter-graphene space or opening up the space to facilitate the entry of sulfuric acid. The interstitial sulfuric acid keeps the space open, allowing the oxidizing agent to further oxidize the graphene planes. Upon removal of excess chemicals, the recovered or dried powder is graphite intercalation compound (GIC) or graphite oxide (GO). The residual chemicals (sulfuric acid and nitric acid) in the dried GIC powder get thermally decomposed during the subsequent high-temperature treatment (heat shock exposure), resulting in the formation of volatile gases in the inter-graphene spaces. These gases, under a high temperature, produce very high pressures that push open graphene planes (expansion and exfoliation). In other words, sulfuric acid and the oxidizer are believed to work in a concerted manner to enable the intercalation and oxidation, both the intercalant and the oxidizer being indispensible. The present invention defies this expectation in many aspects: (a) The liquid intercalating agent can contain just one component (an acid or an oxidizer) or multiple components (2 or more); (b) Smaller amounts or less concentrated acids can work equally well; (c) Weaker acids (e.g. acetic acid) and weaker oxidizer ($H_2O_2$) also work very well; (d) Environmentally benign acids, such as formic acid and carboxylic acid, are also effective.

From the environmental protection perspective, the practice of mixing two or three chemicals together (e.g. mixing sulfuric acid, nitric acid, and/or potassium permanganate) can be troublesome since it would make the recovery, separation, and re-use of chemicals so much more difficult. This is more than just a cost issue, but a larger environmental and societal issue and an industrial scalability issue. The significance of our surprising discovery to use a single-component intercalating agent should not be underestimated or ignored.

The liquid intercalating agent can be an acid selected from sulfuric acid, sulfonic acid, formic acid, acetic acid, or nitric acid. There is no particular constraint on the type of acid that can be used. The liquid intercalating agent may be a mixture containing an acid and an oxidizing agent. The intercalating agent can be a carboxylic acid selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. The carboxylic acid may be selected from the group consisting of saturated aliphatic carboxylic acids of the formula H(CH$_2$)$_n$COOH, wherein n is a number of from 0 to 5, including formic, acetic, propionic, butyric, pentanoic, and hexanoic acids, anhydrides thereof, reactive carboxylic acid derivatives thereof, and combinations thereof. The intercalating agent can be a carboxylic acid admixed with hydrogen peroxide as an oxidizing agent. Preferably, carboxylic acid and hydrogen peroxide are mixed at a weight ratio of 100:1 to 100:50.

Quite significantly, the microwave exposure time can be less than 5 minutes, often less than 2 minutes, or even less than 1 minute. The microwave exposure step may be followed by a step of subjecting the exfoliated graphite to a mechanical shearing treatment to produce a graphene material. The mechanical shearing treatment comprises using air milling, air jet milling, ball milling, rotating-blade mechanical shearing, ultrasonication, or a combination thereof. The exfoliated graphite or graphene may be compressed to form a flexible graphite product.

Another surprising result of the present study is the observation that a wide variety of carbonaceous and graphitic materials can be directly microwave-irradiated in the presence of an intercalating agent. This material may be selected from natural graphite, synthetic graphite, highly oriented pyrolytic graphite, meso-carbon micro-bead, graphite fiber, graphitic nano-fiber, graphite oxide, graphite fluoride, chemically modified graphite, exfoliated graphite, or a combination thereof. This is surprising based on the observation that several types of graphitic materials (e.g. carbon fibers, graphite fibers, carbon nano-fibers, etc.) have a hard-shell structure enclosing a core structure composed of stacks of graphene sheets. These hard skins are known to be highly impermeable to chemicals. This is in contrast to the natural graphite and some artificial graphite that have graphene edges exposed to chemicals and permeable to chemicals.

The presently invented process is capable of producing single-layer graphene sheets. In many examples, the graphene material produced contains at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content no less than 95% by weight, or functionalized graphene.

The carboxylic acid, containing only C, H, and O atoms, may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula H(CH$_2$)$_n$COOH, wherein n is a number of from 0 to 5, including formic, acetic, propionic, butyric, pentanoic, and hexanoic acids, anhydrides thereof, reactive carboxylic acid derivatives thereof, and combinations thereof. In place of the carboxylic acids, the anhydrides or reactive carboxylic acid derivatives such as alkyl esters can also be employed. Representative of alkyl esters are methyl formate and ethyl formate. The most preferred carboxylic acids are formic acid and acetic acid.

Representative of dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Among the polycarboxylic acids, citric acid is preferred due to its availability and low cost.

The presently invented process does not involve the production of GIC and, hence, does not require the exfoliation of GIC at a high exfoliation temperature (e.g. 800-1,100° C.). This is another major advantage from environmental protection perspective. The prior art processes require the preparation of dried GICs containing sulfuric acid and nitric acid intentionally implemented in the inter-graphene spaces and, hence, necessarily involve the decomposition of H$_2$SO$_4$ and HNO$_3$ to produce volatile gases (e.g. NO$_x$ and SO$_x$) that are highly regulated environmental hazards. The presently invented process completely obviates the need to decompose H$_2$SO$_4$ and HNO$_3$ and, hence, is environmentally benign. No undesirable gases are released into the atmosphere during the combined graphite expansion/exfoliation/separation process of the present invention.

The following examples serve to provide the best modes of practice for the present invention and should not be construed as limiting the scope of the invention:

EXAMPLE 1

Nano Graphene Platelets (NGPs) from Artificial Graphite

Twenty (20) mg of meso-phase pitch-derived graphite of approximately 20 μm in size were used in each of the following samples:

Sample 1A: graphite was added to a mixture of 20 mL of formic acid and 1 mL of hydrogen peroxide and the resulting suspension was subjected to direct microwave irradiation for 3 minutes. Electron microscopic examinations of selected samples indicate that the majority of the resulting NGPs contain between single graphene sheet and five sheets.

Sample 1B: graphite was immersed in a mixture of 2 mL of formic acid and 1 mL of hydrogen peroxide at 45° C. for 24 hours. Following the chemical oxidation/intercalation treatment, the resulting intercalated flakes were washed with water and dried. The resulting product is a formic acid-intercalated graphite compound. The dried GIC was then placed in a microwave oven and irradiated for 3 minutes. The thickness of the resulting platelets ranges from 1 graphene sheet to approximately 15 graphene sheets based on SEM and TEM observations.

This example has demonstrated the surprising effectiveness of using direct microwave irradiation of graphite in the presence of a liquid intercalating agent. Both formic acid and hydrogen peroxide are environmentally benign.

EXAMPLE 2

Direct Exfoliation of Artificial Graphite in the Presence of Sulfuric Acid and/or Nitric Acid Twenty mg of artificial graphite as used in Example 1 were used for each of the following samples:

Sample 2A: Graphite was dispersed in a mixture of reagent-grade, highly concentrated sulfuric acid and nitric acid (oxidizer) at a weight ratio of 4:1 (graphite-to-intercalate ratio of 1:3) and the resulting suspension was directly (immediately) submitted to microwave irradiation for 2 minutes.

Sample 2B: Graphite was dispersed in a mixture of diluted sulfuric acid (50% in water) and diluted nitric acid (50% in water) at a weight ratio of 4:1 (graphite-to-intercalate ratio of 1:3) and the resulting suspension was directly submitted to microwave irradiation for 2 minutes.

Sample 2C: Graphite was dispersed in a reaction-grade sulfuric acid (graphite-to-intercalate ratio of 1:3) and the resulting suspension was directly submitted to microwave irradiation for 2 minutes.

Sample 2D: Graphite was dispersed in nitric acid (an oxidizer) with a graphite-to-nitric acid ratio of 1:3, and the resulting suspension was directly submitted to microwave irradiation for 2 minutes.

Sample 2E (prior art process): Graphite was immersed in a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated in a tube furnace at 900° C. for 45 seconds.

The graphene sheets obtained in each sample were examined using atomic force microscopy (AFM), transmission electron microscopy (TEM), and scanning electron microscopy (SEM) to determine their thickness (number of layers) and lateral dimensions (length and width). The graphene sheets suspended in water were cast onto a glass plate to form a thin film (2-5 μm thick) from each sample. The electrical conductivity of the thin film was measured using the four-point probe method. We have also investigated the production yield of each process by comparing the initial graphite material weight with the final graphene material weight. This is significant since we surprisingly observed that conventional Hummer's method of producing graphene involves consumption of graphite, perhaps due to oxidation of carbon in the graphite structure to form carbon dioxide during the chemical oxidation/intercalation process. The reaction of graphite with oxygen to form $CO_2$ means that a significant proportion of graphite is lost. The experimental data are summarized in Table 1 below.

TABLE 1

Characteristics of graphene produced by several methods.

| | Processes | Lateral dimensions | No. of graphene layers | Conductivity of thin film (S/cm) | Production yield |
|---|---|---|---|---|---|
| Sample 2A | Direct Microwave Irradiation (Concentrated acid + oxidizer) | 5-18 μm | 1-3 | 5750 S/cm | 98% |
| Sample 2B | Direct Microwave Irradiation (Diluted acid + diluted oxidizer) | 3-22 μm | 1-5 | 6720 S/cm | 100% |
| Sample 2C | Direct Microwave Irradiation (Acid only) | 2-23 μm | 1-5 | 6325 S/cm | 100% |
| Sample 2D | Direct Microwave Irradiation (Oxidizer only) | 2-22 μm | 1-3 | 5950 S/cm | 100% |
| Sample 2E | Conventional Hummer's Method | 0.3-1.2 μm | 1-3 | $2 \times 10^{-3}$ S/cm (un-reduced); 573 S/cm (reduced); | 73% |

Figure 3A:
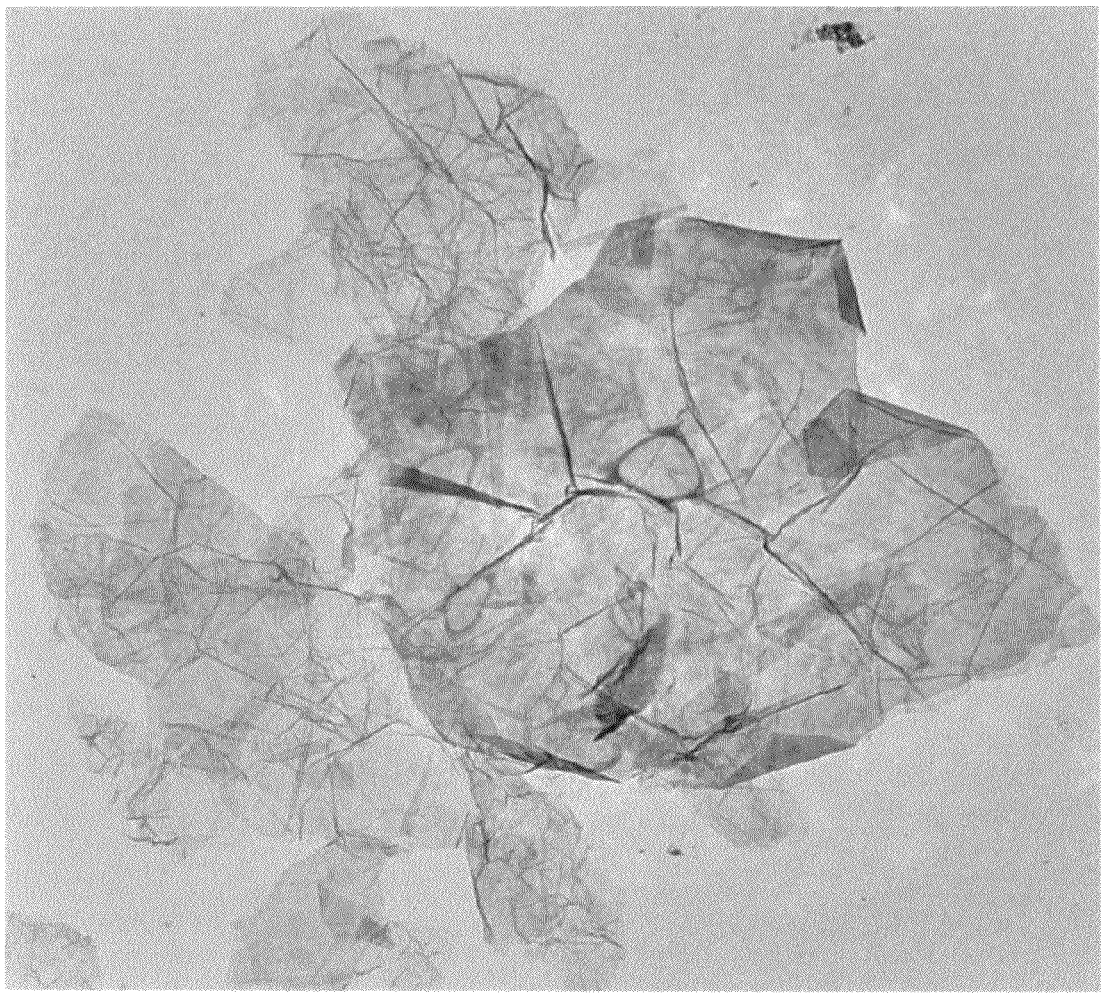
FIG. 3 Transmission electron micrographs of (A) NGPs produced by the direct microwave irradiation process (wider and longer graphene sheets) and (B) NGPs produced by conventional Hummer's route (much smaller graphene sheets, but comparable thickness)

These data have clearly demonstrated the superiority of the presently invented direct microwave irradiation method of producing graphene materials over conventional chemical oxidation/intercalation method. Both methods are capable of producing single-layer graphene, but our method produces graphene sheets that are wider, longer (FIG. 3A), and much more electrically conducting. The conventional Hummer's method and all other chemical oxidation/intercalation method necessarily involve highly oxidizing the graphitic material, creating damage (defects) to the resulting graphene sheets that could never be repaired or recovered (smaller lateral dimensions, FIG. 3B). Even after heavy chemical oxidation with hydrazene, the graphene material (a reduced graphene oxide) still exhibits an electrical conductivity one order of magnitude lower than that of the more pristine graphene produced by the direct microwave irradiation method.

Another highly significant and most surprising result is the observation that single-component intercalating agents (acid alone or oxidizer alone, but not both) work equally well in producing graphene materials compared with the combined acid/oxidizer agents. Furthermore, the method involving a single component alone actually produces graphene sheets that are even more electrically conductive. Additionally, diluted acid/oxidizer works equally well with concentrated acid/oxidizer. These unexpected discoveries have very significant impacts in terms of environmental protection. Furthermore, a single-component intercalating agent leads to a higher production yield than a mixture-based intercalating agent, and diluted acid/oxidizer leads to a higher production yield than a concentrated mixture.

EXAMPLE 3

NGPs from Direct Microwave Irradiation of Natural Graphite in the Presence of a Mixture of Acetic Acid and Hydrogen Peroxide (Oxidizer), or Oxalic Acid and Hydrogen Peroxide Two grams of natural flake graphite having a particle size of 50 mesh were dispersed in two intercalating mixtures: acetic acid and hydrogen peroxide (oxidizer) and oxalic acid (an example of carboxylic acid) and hydrogen peroxide. Each suspension was then subjected to direct microwave irradiation to obtain exfoliated graphite and isolated graphene sheets. Both produce large graphene sheets (20-30 μm) that are very thin (1-7 layers). The chemicals used are all environmentally benign.

EXAMPLE 4

NGPs from Direct Microwave Irradiation of Short Carbon Fiber Segments in the Presence of Nitric Acid Graphite fibers chopped into segments with 0.2 mm or smaller in length were immersed in nitric acid at room temperature, and the resulting suspension was exposed to microwave irradiation for 3 minutes. The diameter of carbon fibers was approximately 12 μm. The process resulted in the formation of ultra-thin NGPs with an average thickness of 1.7 nm.

EXAMPLE 5

NGPs from Carbon Nano-Fibers (CNFs)

A powder sample of carbon nano-fibers was supplied from Applied Science, Inc. (ASI), Cedarville, Ohio. Approximately 2 grams of CNFs were immersed in concentration sulfuric acid Portion of the resulting suspension was exposed to microwave irradiation for 55 seconds, and the remaining portion exposed to microwave irradiation for 3 minutes. The former process produced ultra-thin NGPs >80% being single-layer graphene, and the latter produced NGPs with >90% single-layer graphene.

The invention claimed is:

1. A method of producing exfoliated graphite or graphene directly from a non-intercalated and non-oxidized graphitic material, said method comprising:
   a) dispersing said graphitic material in a liquid intercalating agent to form a suspension, wherein said graphitic material has never been previously exposed to chemical intercalation or oxidation; and
   b) subjecting said suspension to microwave or radio frequency irradiation with a frequency and an intensity for a length of time sufficient for producing said exfoliated graphite or graphene.

2. The method of claim 1, wherein said liquid intercalating agent has a single component only and is not a mixture of an acid and an oxidizing agent.

3. The method of claim 1, wherein said liquid intercalating agent is sulfuric acid alone.

4. The method of claim 1, wherein said liquid intercalating agent is nitric acid alone.

5. The method of claim 1, wherein said liquid intercalating agent is a mixture of sulfuric acid and nitric acid each with a concentration less than 90% by weight in water.

6. The method of claim 1, wherein said liquid intercalating agent is a mixture of sulfuric acid and nitric acid each with a concentration less than 50% by weight in water 7. The method of claim 1, wherein said liquid intercalating agent contains a weak acid selected from formic acid, acetic acid, nitric acid, or carboxylic acid.

8. The method of claim 1, wherein said liquid intercalating agent is a mixture containing an acid and an oxidizing agent.

9. The method of claim 1, wherein said liquid intercalating agent has a single component only and is an oxidizing agent.

10. The method of claim 1, wherein said liquid intercalating agent is a mixture containing an acid and an oxidizing agent dissolved in water wherein said acid or said oxidizing agent has a concentration of less than 50% by weight in water.

11. The method of claim 1, wherein said liquid intercalating agent is a carboxylic acid.

12. The method of claim 1 wherein said intercalating agent is a carboxylic acid selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof.

13. The method of claim 11 wherein said carboxylic acid is selected from the group consisting of saturated aliphatic carboxylic acids of the formula $H(CH_2)_nCOOH$, wherein n is a number of from 0 to 5, including formic, acetic, propionic, butyric, pentanoic, and hexanoic acids, anhydrides thereof, reactive carboxylic acid derivatives thereof, and combinations thereof.

14. The method of claim 1 wherein said intercalating agent is a carboxylic acid and wherein said suspension further comprises hydrogen peroxide as an oxidizing agent.

15. The method of claim 1 wherein said intercalating agent contains a carboxylic acid and an oxidizing agent.

16. The method of claim 1 wherein said microwave or radio frequency irradiation time is less than 5 minutes.

17. The method of claim 1 wherein said microwave or radio frequency irradiation time is less than 2 minutes.

18. The method of claim 1 wherein said microwave or radio frequency irradiation time is less than 1 minute.

19. The method of claim 1, further comprising a step of subjecting said exfoliated graphite to a mechanical shearing treatment to produce a graphene material.

20. The method of claim 19 wherein said mechanical shearing treatment comprises using air milling, air jet milling, ball milling, rotating-blade mechanical shearing, ultrasonication, or a combination thereof.

21. The method of claim 1, further comprising a step of compressing said exfoliated graphite or graphene to form a flexible graphite product.

22. The method of claim 1 wherein said graphitic material is selected from natural graphite, synthetic graphite, highly oriented pyrolytic graphite, graphite fiber, graphitic nano-fiber, graphite fluoride, chemically modified graphite, exfoliated graphite, or a combination thereof.

23. The method of claim 1 wherein said graphitic material is selected from highly oriented pyrolytic graphite, meso-carbon micro-bead, graphite fiber, graphitic nano-fiber, graphite fluoride, chemically modified graphite, exfoliated graphite, or a combination thereof.

24. The method of claim 1 wherein said graphene contains single-layer graphene sheets.

25. The method of claim 1 wherein said graphene contains at least 80% single-layer graphene sheets.

26. The method of claim 1 wherein said graphene contains pristine graphene, oxidized graphene with less than 5% oxygen content by weight, graphene fluoride, graphene fluoride with less than 5% fluorine by weight, graphene with a carbon content no less than 95% by weight, or functionalized graphene.

27. A method of producing a graphene material, said method comprising directly exposing a non-intercalated and non-oxidized graphitic material to microwave irradiation in the presence of a liquid intercalating agent, wherein said graphitic material has never been previously exposed to a chemical or oxidation treatment prior to said microwave irradiation step and said microwave has a frequency and an intensity sufficient for producing a single-layer graphene sheet.

28. The method of claim 27, wherein said intercalating agent is an acid or an oxidizer, but not a mixture of an acid and an oxidizer.

29. The method of claim 27, wherein said intercalating agent does not contain sulfuric acid or nitric acid.

\* \* \* \* \*